United States Patent [19]

Pilny

[11] 4,291,069

[45] Sep. 22, 1981

[54] RENDERING POROUS STRUCTURES IMPERMEABLE BY TREATMENT WITH GELLABLE AMINE POLYMERS

[75] Inventor: Richard J. Pilny, Midland, Mich.

[73] Assignee: The Dow Chemical Company, Midland, Mich.

[21] Appl. No.: 817,271

[22] Filed: Jul. 20, 1977

[51] Int. Cl.³ .............................................. B32B 35/00
[52] U.S. Cl. ........................................ 427/140; 138/97; 166/295; 405/264; 405/270; 427/136
[58] Field of Search ............... 427/140, 136; 428/63; 264/36; 61/36 C; 52/309.4, 309.1; 47/DIG. 10; 166/295; 405/264, 270; 138/97

[56] References Cited

U.S. PATENT DOCUMENTS

| | | | |
|---|---|---|---|
| 2,856,380 | 10/1958 | Roth | 47/1 |
| 2,940,729 | 6/1960 | Rakowitz | 166/295 |
| 3,437,625 | 4/1969 | Bonnel et al. | 166/295 |
| 3,759,197 | 9/1973 | Bracke | 427/136 |
| 3,810,468 | 5/1974 | Harper et al. | 128/284 |
| 3,923,666 | 12/1975 | Dill | 252/8.55 R |
| 3,953,341 | 4/1976 | Martin | 252/8.55 D |
| 3,953,342 | 4/1976 | Martin | 252/8.55 D |

*Primary Examiner*—Ronald H. Smith
*Assistant Examiner*—S. L. Childs

[57] ABSTRACT

Aqueous solutions of amide polymers such as polyacrylamide when treated with small amounts of a water-soluble polyaldehyde at an alkaline pH react to form film gels within a short time at ambient temperature. Such gels are usefully employed to plug porous subterranean formations, for grouting of leaking soil pipes or wells, and to otherwise render porous structures impermeable to the passage of liquids such as water.

13 Claims, No Drawings

4,291,069

RENDERING POROUS STRUCTURES IMPERMEABLE BY TREATMENT WITH GELLABLE AMINE POLYMERS

BACKGROUND OF THE INVENTION

This invention relates to the rendering of porous structures impermeable to passage of liquid such as water by treating such porous structures with an aqueous gellable composition containing an amide polymer.

Soil stabilization and grouting have previously been accomplished by forming an aqueous gel in the unstable soil as shown, for example, in U.S. Pat. Nos. 2,856,380 and 2,940,729 wherein a solution containing an ethylenically unsaturated monomer together with a crosslinking monomer such as methylene bis(acrylamide) is pumped into the ground and there polymerized in situ to form a crosslinked gel. Unfortunately, this prior art procedure not only exposes the operator to toxic monomers such as acrylamide but has been found on occasion to allow such toxic monomers to escape polymerization and thereby permeate into the soil water in toxic form. As a result, otherwise potable water sources are endangered.

Preformed, lightly crosslinked polymers and copolymers of acrylamide have been suggested as sorbents or gelling agents for aqueous fluids, for example, in U.S. Pat. Nos. 3,520,925 and 3,810,468. However, the preparation of such polymers or copolymers is very expensive. Moreover, it has been found that it is virtually impossible to reduce the residual toxic monomer content of such crosslinked polymers to an acceptable level for use in products which may come in contact with humans. More importantly, insofar as the use of such pre-crosslinked polymers in soil treating applications are concerned, such polymers are not readily adapted to be pumped into porous soil, cracks in sewers or similar porous structures.

In view of the deficiencies of prior art methods for treating porous structures with polymeric materials to render them impermeable to passage of liquids such as water, it would be highly desirable to provide an improved method for so treating porous structures whereby the polymer to be employed is readily pumped into or otherwise incorporated in the porous structure to be rendered impermeable without polluting the porous structure and its surrounding environment with toxic substances.

SUMMARY OF THE INVENTION

Accordingly, the present invention is a method for rendering porous structures impermeable to the passage of liquids by treating them with an aqueous gellable composition comprising a water-soluble or water-dispersible aliphatic polyaldehyde and a water-soluble polymer derived from an ethylenically unsaturated amide wherein both the polymer and the polyaldehyde are present in proportion and under conditions of ambient temperature and alkaline pH sufficient to form a gel comprising the amide polymer and capable of rendering the porouss structure impermeable.

An embodiment of particular interest involves placing the aforementioned gellable composition in a porous subterranean formation and subsequently gelling the composition to render the formation impermeable. In a similar embodiment of interest, the gellable composition is pumped or otherwise forced into cracks or similar porosities in sewer pipes, potable water wells and like conduits and then gelled in place thereby plugging and thereby alleviating leakage from the conduits. This latter embodiment is hereinafter referred to as "grouting of porous structures".

It is among the advantages of the invention that firm, non-weeping, structurally sturdy and impervious gels are obtained from the gellable compositions employed in the practice of the present invention. It is a further advantage of the invention that the gelation reaction is initiated within a controlled reasonable period of time after the amide polymer and the aliphatic polyaldehyde, preferably dialdehyde are contacted in an aqueous medium having the proper controlled alkaline pH. Such gelation reaction proceeds readily at ambient temperature.

It is indeed surprising that the method of the present invention provides a firm gel capable of rendering a porous substrate impermeable. This is particularly so when such method is viewed in the light of the teaching of U.S. Pat. No. 3,953,342 which discloses that a similar composition of amide polymer and dialdehyde when injected into a core of sandstone of relatively low permeability caused no plugging and in fact altered the apparent permeability of the sandstone no more than did the amide polymer without dialdehyde. Further, the results obtained in the practice of the present invention are unexpected in view of U.S. Pat. No. 3,759,197 which teaches that the penetration of water into soil is increased when the soil is treated with an aqueous mixture of amide polymer and a dialdehyde.

In addition to the aforementioned utilities of the present invention, the compositions employed in the present invention may also be employed in such applications as blocking off seepage under buildings or highways, preventing seepage loss through dams, dikes and irrigation ditches, blocking infiltration of polluted ground water into potable water wells or to replace aqueous gels prepared from gelatine or vegetable gums as, for example, in air-freshener devices or in gelled cosmetics such as roll-on deodorants and the like.

DETAILED DESCRIPTION OF THE EMBODIMENTS

The amide polymers employed in the practice of this invention are addition polymers containing polymerized ethylenically unsaturated amide monomers which may contain up to 50 mole percent of another ethylenically unsaturated monomer copolymerizable with the amide monomer or monomers. So long as the amide polymer has sufficient molecular weight to react with the dialdehyde solution to form a desired firm gel, molecular weight of the amide polymer is not particularly critical. The viscosity of an aqueous solution of the amide polymer is an index of the molecular weight of said polymer and, thus, for most of the purposes of the present invention it is desirable to employ polymers of relatively low molecular weight so that a substantial proportion of solids can be incorporated in the aqueous solution of polymer without producing excessive viscosity such as to render the solution difficult or impossible to pump. Gelation in accordance with the invention can be obtained with amide polymers having such low molecular weights as to be characterized by a viscosity of only about 100 centipoises for an aqueous 20 percent by weight solution of the polymer. On the other hand, gelation can be obtained with amide polymers of very high molecular weight characterized, for example, by a viscosity of 60 centipoises for an aqueous 0.2 percent by weight solution thereof. In practice, to provide the firmness, abrasion resistance and structural stability desired in gels employed for plugging porous structures, as, for example, in and around sewer pipes, it is preferred to produce a gel containing from about 5 to 10 percent or more of amide polymer solids. Thus, for ease of handling and implacing in the porous structure, it is preferred to employ amide polymers characterized by viscosities of from about 200 centipoises to about 15,000 centipoises for an aqueous 20 percent by weight solution thereof.

To form the desired gel capable of rendering the porous structure impermeable, the amide polymer preferably contains from about 50 to 100 mole percent of one or more amide monomers, more preferably from about 70 to about 100 mole percent, and most preferably from about 90 to about 100 mole percent of amide monomers. Exemplary amide monomers include acrylamide, methacrylamide, fumaramide, ethacrylamide, N-methylacrylamide and the like, provided that the finished polymer contains sufficient acrylamide moieties to render the finished polymer soluble in water to the extent of at least 5 percent by weight and preferably to the extent of 20 percent or more by weight. Acrylamide, per se, is the amide monomer preferred.

Examples of other monomers which may be copolymerized with the aforementioned amide monomers and which do not generally interfere with the gelation reaction include unsaturated aliphatic acids such as acrylic and methacrylic acid, and their water-soluble salts, particularly alkali metal salts, such as sodium acrylate or sodium methacrylate; hydroxy alkyl and alkyl esters of $\alpha,\beta$-ethylenically unsaturated carboxylic acids such as ethyl acrylate, methyl acrylate, butyl acrylate, methyl methacrylate, hydroxyethyl acrylate; sulfoalkyl esters of $\alpha,\beta$-ethylenically unsaturated carboxylic acids such as sulfoethyl acrylate and the sodium salt thereof, vinylbenzyl chloride and vinyl benzyl quaternary ammonium halides such as vinyl benzyl trimethyl ammonium chloride; isopropenyl oxazoline; monovinylidene aromatics and sulfonated monovinylidene aromatics such as styrene and sodium styrenesulfonate. Of course, it is understood that said other monomers should also be chosen so that they do not react with the amide monomer or otherwise interfere with the gelation reaction. Amide polymers are sometimes subject to some degree of hydrolysis during preparation or may purposely have a proportion of their amide groups hydrolyzed to carboxylate groups during or after preparation. For the purposes of this invention such partially hydrolyzed amide polymers are equivalent to the corresponding copolymers of amide monomer and unsaturated aliphatic acid salt.

In general, any aliphatic polyaldehyde, having sufficient solubility or dispersibility in water to enable rapid, intimate mixing with an aqueous solution of amide polymer, may be employed in the method of the present invention. In practice, saturated aliphatic polyaldehydes are preferred. Suitable polyaldehydes include dialdehydes, such as glyoxal, succinaldehyde, glutaraldehyde and the like, as well as more complex chemicals such as water-soluble or water-dispersible polyaldehyde starch derivatives. For most purposes a dialdehyde, particularly glyoxal, is preferred. In the following, the detailed practice of the invention is set forth with respect to dialdehydes; however, it should be understood that such practice applies with other polyaldehydes.

In carrying out the gelation reaction of the method of this invention, it is only necessary that the amide polymer and the aliphatic dialdehyde be thoroughly mixed in the proper proportions in an aqueous medium under conditions of suitable alkalinity. One such procedure is carried out by thoroughly mixing an aqueous solution of the dialdehyde with an aqueous solution of the amide polymer having the proper alkalinity. Alternatively, an aqueous solution of dialdehyde having sufficient alkalinity is mixed with an aqueous solution of amide polymer. In yet another procedure, an aqueous solution containing the desired proportions of amide polymer and dialdehyde is prepared at a pH of less than 7 and the resulting solution thoroughly mixed with an alkaline solution to initiate gelation. Excess alkali, such that the mixture has a pH of 12 or more after completion of the gelation reaction, is to be avoided since such excess alkalinity may degrade the gel.

The concentration of the amide polymer in the aqueous medium employed will vary depending upon the molecular weight of the polymer and the firmness of the gel desired. In general, however, when carrying out the gelation reaction, the starting solution of the amide polymer, most preferably polyacrylamide, should contain from about 0.5 to about thirty weight percent of polymer. On the other hand if the molecular weight of the polymer is in a desirable range, such that an aqueous 20 percent by weight solution of the polyacrylamide has a viscosity in the range of from about 200 to about 10,000 centipoises, then concentrations from about 5 to about 20 weight percent of the amide polymer can advantageously be employed. It is understood, however, that somewhat higher concentrations than the aforementioned can be employed with relatively low molecular weight amide polymers if the aqueous solution of amide polymer is substantially free of toxic ingredients such as residual amide monomer.

The aqueous solution of dialdehyde used in the gelation reaction may contain from a very small concentration of dialdehyde up to the saturation concentration. In general practice, the solution contains from about one to about forty weight percent of the dialdehyde and is employed in an amount to provide about 1 mole of dialdehyde for every 15 to about 100 moles of amide monomer combined in the polymer. For sewer grouting it is preferred to employ the dialdehyde in the amount of about 1 mole for every 35 to about 45 moles of amide monomer combined in the polymer. Preferably to prepare a firm gel, particularly beneficial in the plugging or otherwise sealing of porous substrates, and aqueous alkaline solution containing from about 2 to about 20, most preferably from about 8 to about 12, weight percent of amide polymer (having a molecular weight such that an aqueous 20 percent by weight solution thereof has a viscosity of from about 100 centipoises to about 10,000 centipoises as determined with a Brookfield viscometer) is combined with the dialdehyde by adding thereto with thorough mixing sufficient of an aqueous solution containing from about 2 to about 40 weight percent of aliphatic dialdehyde such as glyoxal to provide from about 0.01 to about 0.067 mole of dialdehyde per mole of amide monomer combined in said polymer. In such practice the alkalinity of the polymer solution or of the dialdehyde solution or both is adjusted by addition of a predetermined amount of an alkaline reagent, such as an alkali metal hydroxide, carbonate or phosphate, so that the aqueous mixture of polymer and dialdehyde would have a pH in the range of about 7.5 to about 12, preferably 11 to 12, immediately after mixing in the absence of change resulting from the gelation reaction. In general, when operating at temperatures of about 20° C. or greater and particularly in the preferred pH range of about 11 to 12, the gelation reaction is initiated rapidly when the amide polymer and polyaldehyde are brought together in the alkaline solution. Thus, for example, when a polyacrylamide solution at a temperature of from about 20° C. to 25° C. is adjusted to a pH of 11 to 12 and rapidly mixed with a small amount of a concentrated solution of glyoxal, the resulting mixture sets to a firm gel within a matter of seconds while the pH falls to the range of 9 to 9.5. On the other hand, if the glyoxal solution is added to a polyacrylamide solution adjusted to a pH of 7.5 and at room temperature the gelation reaction proceeds very slowly and practical gel times can be obtained only if the temperature of the mixture is raised to 40° C. or higher. Thus it is apparent that a wide range of gel times can be obtained with any particular mixture of amide polymer and polyaldehyde by suitable adjustment of the temperature or pH or both.

The amide polymer solutions employed may be prepared by known methods. Thus, for example, an amide monomer or monomer mixture as defined above may be dissolved in water and subjected to catalytic solution polymerization by addition thereto of a redox catalyst system such as a peroxide-bisulfite system or by the use of a peroxide or azo catalyst with controlled heating. Alternatively the polymer may be prepared by known methods as a water-in-oil suspension or emulsion in a water-insoluble liquid such as a liquid hydrocarbon and the desired polymer solution be prepared by inverting said emulsion or solution in water, for example, with the aid of a surfactant.

In the practice of the invention, it is generally necessary to provide means for emplacing the mixed solutions of polymer and dialdehyde in the position desired before gelation occurs. Thus, for example, an alkaline solution of polyacrylamide and a solution of dialdehyde may be pumped by separate pipe systems and mixed at (or immediately adjacent to) the site where it is desired to deposit the gel. In the plugging of porous subterranean strata, as when undesired seepage is polluting a water well, packers can be placed above and below the porous strata and the polyacrylamide solution and dialdehyde solution introduced into the space between the packers through separate pipes whereby the solutions are mixed in said space and forced under pressure into the porous formation where gelation provides the desired plugging.

When a crack or perforated area is detected in a sewer pipe or well casing, for example, by remote television survey or other pipe or well logging method, it is convenient to employ a packer having endpieces which can be inflated hydraulically to provide positive pressure seals on either side of the cracked or perforated area, said endpieces being connected by a cylindrical member of somewhat smaller diameter than the diameter of the pipe or casing to define an annular space contiguous to the cracked or perforated area. The solutions of polyacrylamide and of dialdehyde are introduced rapidly under pressure through separate pipes in the proper proportions and at the proper alkalinity into the annular space where mixing occurs and the mixture is forced by pressure through the cracked or perforated area and into any porosities in the surrounding medium. When a sharp rise in back pressure is detected which indicates that gelation is occurring in the available porosities, pumping is discontinued and the packer is deflated and removed. Alternatively, one of the solutions employed above may be a solution of a polyacrylamide adjusted to an acidic pH in the range of 4 to 5 with the predetermined gelation quantity of glyoxal dissolved therein while the second solution consists of an aqueous alkaline reagent such as a solution of sodium hydroxide or trisodium phosphate.

The following examples illustrate the invention but are not to be construed as limiting its scope.

EXAMPLE 1

An aqueous solution containing 20 percent by weight of a homopolymer of acrylamide was found to have a viscosity of 10,800 centipoises at 23° C. as determined with a Brookfield LVT viscometer using the No. 3 spindle at 6 revolutions per minute. Eighty grams of the above solution was diluted with 80 grams of deionized water. The resulting solution (having a viscosity of 294 centipoises at 25° C.) was adjusted to a pH of about 11.5 by addition of the required amount of aqueous 5 N sodium hydroxide solution and was then rapidly mixed with 0.8 milliliters of an aqueous 40 percent by weight solution of glyoxal (density=1.26 g/ml). The resulting mixture set in a period of about 27 seconds to form a firm gel which did not flow when the container was inverted.

EXAMPLE 2

Following the general procedure of Example 1, portions of an aqueous 20 percent by weight solution of polyacrylamide, characterized by a viscosity of 400 cps at 25° C. as determined with a Brookfield viscometer, were diluted with water and adjusted with sodium hydroxide to provide a series of 40-gram aliquots of aqueous polyacrylamide solution containing 10 percent by weight of polymer solids and having a pH in the range of 11.5 to 12. One such aliquot was rapidly mixed with 0.2 milliliter of an aqueous 40 percent by weight solution of glyoxal. The resulting mixture set in about 15 seconds to form a firm gel which did not flow from the container on inversion thereof. During gelation the pH of the mixture decreased to the range of about 9 to 9.5.

Others of the above-described aliquots of polymer solution were mixed with 0.15 milliliter or 0.1 milliliter of the 40 percent glyoxal solution and firm gels were obtained.

EXAMPLE 3

A further 40-gram aliquot of aqueous 10 percent by weight polyacrylamide solution as described in Example 2 was rapidly mixed with 2.4 milliliters of an aqueous 25 percent by weight solution of glutaraldehyde to provide one chemical equivalent of aldehyde per 5 moles of acrylamide in the polymer. A firm gel was obtained in 180 seconds. Similar good results were obtained when a further aliquot of the polymer solution was mixed with 0.8 milliliter of an aqueous 25 percent by weight dispersion of dialdehyde-starch (an anionic dispersion of dialdehyde-starch, commercially available under the brand name Sumstar 190).

EXAMPLE 4

A packing device is positioned in a sewer wherein a large eroded crack has developed where the seal between two sections of pipe has failed. The device has inflatable collars at either end of a rigid cylinder having a diameter sufficiently smaller than the sewer pipe to enable the device to be maneuvered into the desired position by cables. The rigid cylinder carries dual piping which connects to nozzles positioned in the annular space between the cylinder and the sewer pipe and directed so that streams of fluid issuing from the nozzles will impinge on each other and mix together. The piping is connected to pressure hoses which are carried back through a manhole and connected to the outputs of positive displacement metering pumps. At least one of said outputs is fitted with a pressure gauge. The input end of one pump is connected to a first tank containing a known weight of an aqueous 20 percent by weight solution of a polyacrylamide similar to that of Example 2, above, except that the pH was adjusted to 4.8 to 5 with mineral acid. This solution is characterized by a viscosity of 500 cps and had been treated with a small amount of sodium sulfite to react out any residual acrylamide monomer and with an antimicrobial amount of sodium pentachlorophenate to protect against mold growth. To said solution there was admixed about 1 part by weight of an aqueous 40 percent by weight solution of glyoxal for each 100 parts by weight of polyacrylamide solution. No gelation occurred at the predetermined pH of about 5 for the mixture when maintained at room temperature.

The input end of the second pump is connected to a second tank containing an aqueous solution of trisodium phosphate (containing about 1 percent by weight of $Na_3PO_4$ and having a pH of 11.5) in an amount at least equal in volume to the solution in the first tank. The pumps are calibrated so that they deliver equal volumes in equal times. When a test sample of solution from the first tank was mixed with an equal volume of the solution from the second tank it was found that the resulting mixture set to a firm gel in less than 30 seconds.

The packing device is positioned so that one of the collars is on either side of the crack in the sewer and the collars are inflated to form a positive pressure seal against the interior of the sewer pipe. The pumps are started so that the polymer-dialdehyde solution and the trisodium phosphate solution are mixed in the annular space of the packing device and the resulting mixture forced into and through the cracks into the surrounding medium. When the pressure gauge shows a sharp rise in pressure the pumps are disconnected and the packing device deflated and removed from the sewer. On subsequent inspection it is found that the cracked area is filled and covered with a firm adherent aqueous polymer gel.

In cases where a highly porous formation or void exists outside a cracked or perforated sewer pipe or well casing it will generally be desirable to first introduce a more dilute solution containing from 2 to 10 percent by weight of polyacrylamide together with a correspondingly decreased proportion of dialdehyde solution and an alkaline agent so that the gellable composition may be pumped into the porosities or voids more readily. In such cases it is usually desirable to increase the concentration of polymer and proportion of dialdehyde toward the end of the treatment in order to assure the desired structural integrity in the final seal.

In instances wherein it is desirable to have a noticeable delay between the time when the amide polymer, the dialdehyde and the alkaline agent are contacted and the time in which the gel reaction occurs, it is desirable to reduce the alkalinity of the mixed solutions such that the pH of such solution is at a value between about 7.5 to about 11, preferably from about 8 to about 10. At the lower values of pH in the aforementioned ranges, the time between initial contacting of the reactants and gelation, while it depends significantly on the concentration of the reactants, will generally vary from about 3 to about 48 hours whereas at the higher levels of pH used for minimal delay in gelation time gelation occurs at times from about 15 to about 30 seconds.

Following the general procedure set forth in this Example 4, the gels prepared in accordance with Examples 1–3 exhibit suitable ability to plug or render impermeable the porous structure of Example 4 as well as other porous structures mentioned hereinbefore.

What is claimed is:

1. A method for rendering a porous structure impermeable which comprises treating the porous structure with a gellable aqueous composition comprising an aqueous medium having dispersed therein an amide polymer and an aliphatic polyaldehyde in proportions such that under ambient temperatures and at an alkaline pH greater than 7.5 the gellable composition upon being forced into and over the porosities of the structure reacts to form a gel capable of rendering said structure impermeable to the passage of aqueous liquids.

2. A method according to claim 1 wherein the gellable composition is prepared by mixing an aqueous solution of amide polymer and an aqueous solution or dispersion of a polyaldehyde at a pH greater than 7.5 in or immediately adjacent to said porosities.

3. A method according to claim 2 wherein the mixing takes place in aqueous medium at a pH of 11.5 to 12.

4. A method according to claim 1 wherein the amide polymer is a homo polymer or copolymer of acrylamide.

5. A method according to claim 1 wherein the polyaldehyde is a dialdehyde.

6. A method according to claim 5 wherein the dialdehyde is glyoxal.

7. A method according to claim 1 wherein the gellable composition is prepared by forming a first aqueous solution of an amide polymer at a pH of about 4 to about 5, adding to said first solution an aqueous solution or dispersion of a polyaldehyde in an amount to provide the equivalent of from 0.01 to about 0.067 mole of dialdehyde per mole of amide monomer combined in the polymer and admixing the resulting modified first solution with a second aqueous solution containing sufficient inorganic alkaline agent to bring the resulting composition to a pH greater than 7.5.

8. A method according to claim 7 wherein said second solution is an aqueous solution of an alkali metal hydroxide, carbonate or phosphate having a pH of from 11 to 12.

9. A method according to claim 8 wherein the amide polymer is a polymer of acrylamide and the polyaldehyde is glyoxal.

10. A method according to claim 9 wherein the amide polymer is a polyacrylamide having a molecular weight such that an aqueous 20 percent by weight solution of said polymer has a viscosity of from about 100 to about 10,000 centipoises.

11. In a method for grouting sewers and water wells which comprises locating a leaking area in a subterranean conduit, isolating said leaking area with packing devices and pumping a gellable composition into and over said area, the improvement which comprises preparing said gellable composition by admixing an aqueous solution of at least five weight percent of a water-soluble amide polymer with sufficient of an aqueous solution of a water-soluble aliphatic dialdehyde to provide from about 0.01 to about 0.067 mole of dialdehyde per mole of amide monomer combined in said polymer and with sufficient of an inorganic alkaline reagent to produce a pH of greater than 7.5.

12. A method according to claim 11 wherein the gellable composition is brought to a pH of about 11.5 to 12 to initiate rapid gelation.

13. A method according to claim 12 wherein the amide polymer is a polyacrylamide and the dialdehyde is glyoxal.

* * * * *